United States Patent
Lee et al.

(10) Patent No.: US 11,861,431 B2
(45) Date of Patent: Jan. 2, 2024

(54) DEVICE, SYSTEM, METHOD, AND COMPUTER PROGRAM FOR PRINTING QR CODE

(71) Applicants: MNH SOFT, CO., LTD., Seoul (KR); Kwang Yul Lee, Seoul (KR)

(72) Inventors: Kwang Yul Lee, Seoul (KR); Mee Ran Jang, Seoul (KR); Tae Yeon Yoo, Incheon (KR)

(73) Assignees: MNH Soft, Co., Ltd., Seoul (KR); Kwang Yul Lee, Seoul (KR)

( * ) Notice: Subject to any disclaimer, the term of this patent is extended or adjusted under 35 U.S.C. 154(b) by 0 days.

(21) Appl. No.: 17/596,619

(22) PCT Filed: Jun. 15, 2020

(86) PCT No.: PCT/KR2020/007723
§ 371 (c)(1),
(2) Date: Dec. 14, 2021

(87) PCT Pub. No.: WO2020/251327
PCT Pub. Date: Dec. 17, 2020

(65) Prior Publication Data
US 2022/0261560 A1    Aug. 18, 2022

(30) Foreign Application Priority Data
Jun. 14, 2019 (KR) .................. 10-2019-0071081

(51) Int. Cl.
*G06K 1/12* (2006.01)
*G06K 19/06* (2006.01)
*G06T 3/00* (2006.01)

(52) U.S. Cl.
CPC ....... *G06K 1/121* (2013.01); *G06K 19/06037* (2013.01); *G06T 3/0043* (2013.01)

(58) Field of Classification Search
CPC . G06K 1/121; G06K 19/06037; G06T 3/0043
See application file for complete search history.

(56) References Cited

U.S. PATENT DOCUMENTS

2002/0058448 A1  5/2002  Hibler
2004/0035935 A1  2/2004  Takahashi et al.
(Continued)

FOREIGN PATENT DOCUMENTS

CN   101342821 A   1/2009
CN   201350729 Y   11/2009
(Continued)

OTHER PUBLICATIONS

International Search Report of PCT/KR2020/007723, dated Oct. 6, 2020, 4 pages.
(Continued)

*Primary Examiner* — Laura A Gudorf
(74) *Attorney, Agent, or Firm* — Lewis Roca Rothgerber Christie LLP

(57) ABSTRACT

A device for printing a QR code comprises: at least one processor; and at least one memory in which instructions are stored, the instructions, when executed by the at least one processor, causing the at least one processor to perform an operation, wherein the at least one processor receives QR data from a server, generates a first QR image on the basis of the QR data, performs image-conversion processing for the first QR image to generate a second QR image, stores the second QR image in the memory, and prints the second QR image stored in the memory on a curved body.

8 Claims, 3 Drawing Sheets

(56) References Cited

U.S. PATENT DOCUMENTS

| | | |
|---|---|---|
| 2007/0125862 A1 | 6/2007 | Uchiyama et al. |
| 2018/0157946 A1* | 6/2018 | Landry ................. G06K 1/121 |
| 2018/0370250 A1 | 12/2018 | Muszkieta et al. |

FOREIGN PATENT DOCUMENTS

| | | | |
|---|---|---|---|
| CN | 102016785 A | 4/2011 | |
| CN | 104057719 A * | 9/2014 | |
| CN | 105046184 A | 11/2015 | |
| CN | 105095818 A | 11/2015 | |
| CN | 105374008 A | 3/2016 | |
| CN | 105678692 A | 6/2016 | |
| CN | 106874982 A | 6/2017 | |
| CN | 106951942 A | 7/2017 | |
| CN | 107089060 A | 8/2017 | |
| CN | 107145929 A | 9/2017 | |
| CN | 107679436 A | 2/2018 | |
| DE | 20306312 U1 * | 10/2003 | ............ A01K 43/10 |
| JP | 2004-164532 A | 6/2004 | |
| JP | 2004-188883 A | 7/2004 | |
| JP | 2007-106048 A | 4/2007 | |
| JP | 2007-148558 A | 6/2007 | |
| JP | 2009-25992 A | 2/2009 | |
| JP | 2015-9562 A | 1/2015 | |
| JP | 2016-14091 A | 8/2016 | |
| KR | 20-0359395 Y1 | 8/2004 | |
| KR | 10-2013-0115054 A | 10/2013 | |
| KR | 10-2085480 B1 | 5/2020 | |

OTHER PUBLICATIONS

Mathematica, "QR Code in shopping cart handle," Jun. 2, 2013, Retrieved from the Internet: URL:https://mathematica.stackexchange.com/questions/26268/qr-code-in-shopping-cart-handle/26281#26281 See pp. 1-17.

Ostkamp et al., QR codes on curved media facades: Two approaches for inverse distortion based on raytracing and image warping. Software Engineering Lab, Munster University of Applied Sciences. pp. 424-429, Jan. 2014.

https://mathematica.stackexchange.com/questions/26268/qu-code-in-shopping-cart-handle, Jun. 27, 2023, 16 pages.

Ostkamp M., et al., "QR Codes on Curved Media Facades—Two Approaches for Inverse Distortion based on Raytracing and Image Warping", Proceedings of the 9th International Conference on Computer Graphics Theory and Applications, GRAPP—2014, ISBN: 978-989-758-002-4, pp. 424-429.

Korean Office Action dated Aug. 12, 2019 corresponding to Korean Application No. 10-2019-0071081, 3 pages.

SIPO Office Action dated Mar. 15, 2023 corresponding to Chinese Application No. 202080043520.4, 8 pages.

* cited by examiner

US 11,861,431 B2

DEVICE, SYSTEM, METHOD, AND COMPUTER PROGRAM FOR PRINTING QR CODE

CROSS-REFERENCE TO RELATED APPLICATION(S)

This application is a U.S. National Phase Patent Application of International Application Number PCT/KR2020/007723, filed on Jun. 15, 2020, which claims priority to Korean Patent Application Number 10-2019-0071081, filed Jun. 14, 2019. The entire content of each of which is incorporated herein by reference.

TECHNICAL FIELD

The present disclosure relates to a device, system, method, and computer program for printing a quick response (QR) code, and more particularly, to a device, system, method, and computer program for printing a QR code modified from a QR image to allow QR recognition even on an egg-shaped curved figure.

BACKGROUND ART

As Korean egg consumption is continuously increasing, the demand for securing hygiene and safety of eggs in the dairy industry is increasing due to an insecticide problem, bird influenza, and the like.

The Ministry of Food and Drug Safety has recently announced amendments to some of "Livestock Display Standards" while focusing on displaying egg laying dates on eggshells (the shell of eggs) to secure hygiene and safety of eggs. However, egg farms have pointed out that government measures to secure safety of eggs by simply displaying egg laying dates are empty talk unless basic measures such as building a cold chain system, expanding an egg distribution center, and the like are taken first.

Japanese Unexamined Patent Application Publication No. 2016-146091 (hereinafter referred to as 'related art') is the background art of the present disclosure. The related art discloses eggs, an information display system, and an information display method for achieving an advertisement effect by displaying information such as an advertisement on the surfaces of eggs.

Although printing a QR code on an egg is disclosed in the related art, the related art discloses simply printing a square QR code on a side surface of an egg but does not disclose a technique for modifying an image of a QR code and printing the modified image to allow QR recognition even on an uppermost or lowermost end of an egg.

The present disclosure provides a device, system, method, and computer program for modifying an image of a QR code and printing the modified image to allow QR recognition even on an uppermost or lowermost end of an egg.

DISCLOSURE

Technical Problem

The present disclosure is directed to providing a device, system, method and computer program for modifying an image of a quick response (QR) code and printing the modified image to allow QR recognition even on an uppermost or lowermost end of an egg, so that the QR code may be printed on uppermost ends of eggs seated in a packaging box and a user may easily check a production site, a distribution process, an expiration date of each of the eggs through recognition of the QR code.

Technical aspects of the present disclosure are not limited thereto, and other various technical aspects that are within the scope of the present disclosure obvious to technicians of ordinary skill may be included in the present disclosure.

Technical Solution

According to an aspect of the present disclosure, a device for printing a quick response (QR) code includes at least one processor, and at least one memory storing instructions causing, when executed by the at least one processor, the at least one processor to receive quick response (QR) data from a server, create a first QR image based on the QR data, perform image conversion on the first QR image to create a second QR image, store the second QR image in the at least one memory, and print the second QR image on a curved figure, wherein the first QR image includes a first length representing a length from a center of the first QR image in a first direction; a second length representing a length from the center of the first QR image in a second direction perpendicular to the first direction; and a third length representing a length from the center of the first QR image in a third direction diagonal to the first direction and the second direction, the second QR image includes a fourth length representing a length from a center of the second QR image in the first direction; a fifth length representing a length from the center of the second QR image in the second direction; and a sixth length representing a length from the center of the second QR image in the third direction, the fourth length and the fifth length of the second QR image are respectively greater than the first length and the second length of the first QR image, and the sixth length of the second QR image is equal to the third length of the first QR image.

In the device for printing the QR code according to an embodiment of the present disclosure, the image conversion may be performed on the basis of the following Equations (1) to (3):

$$x_d = \frac{x_u}{1 - \alpha|x_u|^2}, \quad \text{Equation (1)}$$

$$y_d = \frac{y_u}{1 - \beta|y_u|^2}, \text{ and} \quad \text{Equation (2)}$$

$$r_d = \frac{r_u}{1 - \gamma|r_u|^2}, \quad \text{Equation (3)}$$

wherein in Equation (1), $x_u$ denotes the first length, $x_d$ denotes the fourth length, and $\alpha$ denotes a first weight assigned to the first direction, in Equation (2), $y_u$ denotes the second length, $y_d$ denotes the fifth length, and $\beta$ denotes a second weight assigned to the second direction, in Equation (3), $r_u$ denotes the third length, $r_d$ denotes the sixth length, $\gamma$ denotes a third weight assigned to the third direction, wherein $\alpha$ and $\beta$ may be greater than 0 and less than 0.25, $\gamma$ may be 0, and the curved figure may include an egg-shaped curved figure with different radii of curvature at points on curved surfaces.

In the device for printing the QR code according to an embodiment of the present disclosure, during the image conversion, the at least one processor may be configured to divide the first QR image into grids, reduce the second weight from $\beta$ to 0 as distances of the grids from a center of the first QR image in the first direction and a direction opposite to the first direction increase, reduce the first weight from α to 0 as distances of the grids from the center of the first QR image in the second direction and a direction opposite to the second direction increase, apply the first weight to grids on the same line in the first direction, and apply the second weight to grids on the same line in the second direction.

In the device for printing the QR code according to an embodiment of the present disclosure, the at least one processor may be further configured to reduce the first weight and the second weight as a radius of curvature at the center of the curved figure on which the second QR image is to be printed increases, and increase the first weight and the second weight as the radius of curvature at the center of the curved figure on which the second QR image is to be printed decreases.

In the device for printing the QR code according to an embodiment of the present disclosure, the at least one processor may be further configured to determine whether a first ratio of the fourth length of the second QR image to the first length of the first QR image is equal to or less than a first predetermined value store the second QR image in the memory when the first ratio is equal to or less than the first predetermined value, reduce the first weight, calculate a fourth length of a new second QR image generated through the image conversion, and determine whether a ratio of the fourth length of the new second QR image to the first length of the first QR image is equal to or less than the first predetermined value, when the first ratio is greater than the first predetermined value, determine whether a second ratio of the fifth length of the second QR image to the second length of the first QR image is equal to or less than the first predetermined value, and store the second QR image in the memory when the second ratio is equal to or less than the first predetermined value, and reduce the second weight, calculate a fifth length of a new second QR image generated through the image conversion, and determine whether a ratio of the fifth length of the new second QR image to the second length of the first QR image is equal to or less than the first predetermined value, when the second ratio is greater than the first predetermined value, wherein the first predetermined value may be selected from a range of 1 to 1.4.

In the device for printing the QR code according to an embodiment of the present disclosure, the at least one processor may be further configured to calculate an area of the first QR image and an area of the second QR image, determine whether a ratio of the area of the second QR image to the area of the first QR image is equal to or less than a second predetermined value, store the second QR image in the memory when the ratio is equal to or less than the second predetermined value, and reduce the first weight and the second weight, calculate an area of a new second QR image generated through the image conversion, and determine whether a ratio of the area of the new second QR image to the area of the first QR image is equal to or less than the second predetermined value, when the ratio is greater than the second predetermined value, wherein the second predetermined value is selected from a range of 1 to 1.4.

In the device for printing the QR code according to an embodiment of the present disclosure, the at least one processor may be further configured to smooth a boundary between the grids by applying an anti-aliasing technique, and reduce a ratio between grids into which the first QR image is to be divided as the radius of curvature at the center of the curved figure on which the second QR image is to be printed increases, and increase the ratio between grids into which the first QR image is to be divided as the radius of curvature at the center of the curved figure on which the second QR image is to be printed decreases.

According to another aspect of the present disclosure, a system for printing a QR code includes the device for printing a QR code, a clock with a certain period, a conveyor belt located below the device and configured to transfer a curved figure according to the period of the clock, and a sensor located on the conveyor belt and configured to detect whether there is the curved figure on the conveyor belt, wherein, when the sensor detects that there is the curved figure on the conveyor belt, the device prints a second QR image on the curved figure below the device.

According to another aspect of the present disclosure, a method of printing a quick response (QR) code includes receiving QR data from a server, creating a first QR image based on the QR data, performing image conversion on the first QR image to create second QR image, storing the second QR image in a memory, and printing the second QR image stored in the memory on a curved figure, wherein the curved figure includes an egg-shaped curved figure with different radii of curvature from points on curved surfaces, and in the image conversion, lines connecting vertices of the first QR image are modified to be convex while maintaining the vertices of the first QR image so as to create the second QR image allowing QR recognition even on the curved figure.

According to another aspect of the present disclosure, there is provided a computer program stored in a medium to perform the method of printing a QR code in an electronic device.

Advantageous Effects

According to the present disclosure, an image-modified quick response (QR) code can be printed on uppermost ends of eggs seated in a packaging box, so that a user can recognize the QR code on the eggs to easily check a production site, a distribution process, an expiration date, etc. of the eggs.

Regardless of a position on an egg at which the QR code is printed, a degree of modification of a QR image can be controlled according to a radius of curvature at the position, and thus the QR code can be printed to be recognizable even using a general QR recognition camera.

By printing such an image-modified QR code on eggs starting from an egg production stage, not only final consumers but also a middle producer/consumers at a middle distribution stage can easily recognize the QR code to easily check a production site, a distribution process, etc. of the eggs.

In addition, even when environmental and sanitary problems such as an insecticide problem and bird influenza occur, all eggs are not discarded but eggs to be discarded can be sorted by checking production sites, production schedules, etc. through QR recognition

MODES OF THE INVENTION

Hereinafter, a device, system, method and computer program for printing a quick response (QR) code according to the present disclosure will be described in detail with reference to the accompanying drawings. Embodiments described herein are provided to help those of ordinary skill in the art easily understand the technical idea of the present disclosure and thus the present disclosure is not limited thereby. The items illustrated in the accompanying drawings are schematized to easily describe embodiments of the present disclosure and thus may be different from forms in which the items are actually embodied.

Components to be described below are only examples provided to implement the present disclosure. Thus, in another embodiment of the present disclosure, other components may be used without departing from the idea and scope of the present disclosure.

An expression such as "comprise", when used herein to indicate the inclusion of some elements, is an open expression intended to simply indicate the presence of the elements and should not be understood as excluding other components.

Although the present disclosure is described herein with respect to various embodiments, the present disclosure should not be understood as being limited thereto. It should be apparent to those of ordinary skill in the art that the present disclosure includes various alternatives, modifications, and equivalents.

The terms "user terminal" and "electronic device" may each be understood as a smart phone, a wearable device (e.g., smart glasses, a watch, etc.), an Internet-of-Things (IoT) terminal, a personal digital assistant (PDA), a tablet personal computer (PC), a laptop computer, or any other devices capable of communicating with a server.

The term "medium" includes a computer-readable storage medium. The computer-readable storage medium may be an available medium accessible by a computer. Examples of the computer-readable storage medium may include, but are not limited to, a random access memory (RAM), a read-only memory (ROM), an electrically erasable and programmable ROM (EEPROM), a compact disc (CD)-ROM, other optical disk storage devices, a magnetic disk storage device, other magnetic storage devices, and any other media that are capable of being used to deliver or store desired program code in the form of instructions or data structures and are accessible by a computer.

Figure 1:
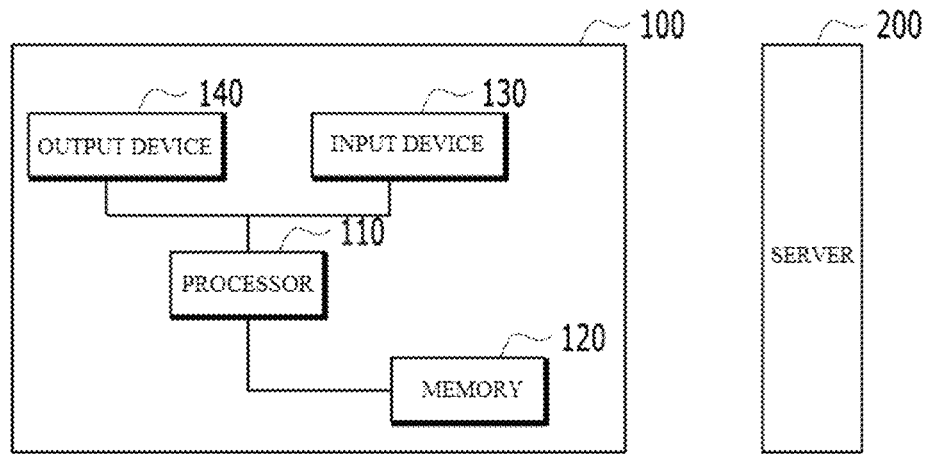
FIG. 1 is a conceptual diagram illustrating a device for printing a quick response (QR) code according to an embodiment of the present disclosure.

Hereinafter, a device for printing a QR code according to an embodiment of the present disclosure will be described in detail with reference to FIG. 1.

A device 100 for printing a QR code includes at least one processor 110 and at least one memory 120 storing instructions causing the at least one processor 110 to perform operations when executed by the at least one processor 110, an input device 130 configured to receive a QR image from a server 200 or receive a user input, and an output device 140 configured to spray ink so as to print an QR image.

The processor 110 receives QR data from the server 200. In this case, the QR data may be data for creating a QR image, e.g., data to which a base64-string technique is applied. Therefore, because one image matches one string, a QR image corresponding to the QR data may be created based on the QR data.

When the created QR image is subjected to image conversion, the image-converted QR image is stored in the memory 120 and printed on an object by the output device 140. The object includes a curved figure and an example of the curved figure is an egg. A curved figure such as an egg has an ovoid shape with different radii of curvature at points on a curved surface of the egg, and the present disclosure relates to a technique for printing a QR code on the curved figure.

Figure 2:
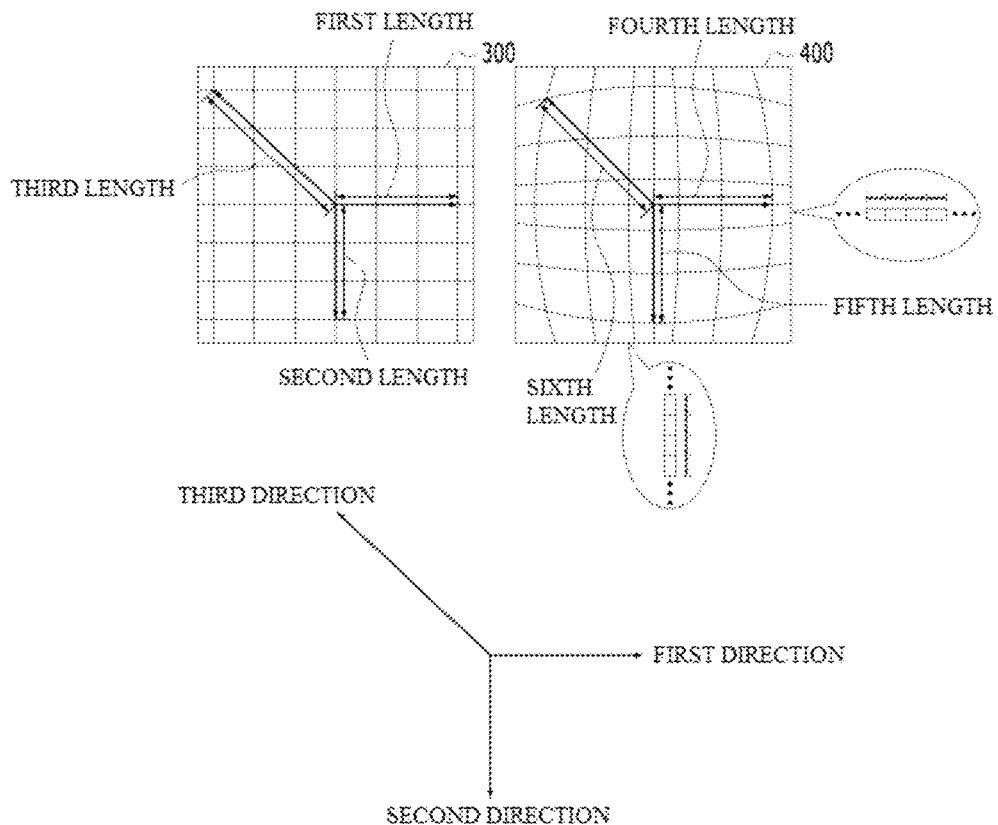
FIG. 2 is a diagram for describing image conversion performed on a QR code according to an embodiment of the present disclosure.

Hereinafter, image conversion performed on a QR code according to an embodiment of the present disclosure will be described in detail with reference to FIG. 2.

An original QR image (hereinafter referred to as the "first QR image") 300 that is created based on QR data and has yet to be image-converted has a first length representing a length from a center of the first QR image 300 in a first direction, a second length representing a length from the center of the first QR image 300 in a second direction perpendicular to the first direction, and a third length representing a length from the center of the first QR image 300 in a third direction diagonal to the first and second directions. For example, when the first QR image 300 has a size of 1×1 cm$^2$, the first length may be 0.5 cm, the second length may be 0.5 cm, and the third length may be about 0.71 cm. A size of a QR image may be selected within a range of 1×1 cm$^2$ to 1.2×1.2 cm$^2$.

A QR image (hereinafter referred to as the "second QR image") 400 that is obtained by image-converting the first QR image 300 and is to be printed on a curved figure has a fourth length representing a length from a center of the second QR image 400 in the first direction, a fifth length representing a length from the center of the second QR image 400 in the second direction, and a sixth length representing a length from the center of the second QR image 400 in the third direction.

Each side of the image-converted QR image having a square shape should be modified to be convex so that the image-converted QR image may be printed on a curved figure such as the shell of an egg and QR recognition may be implemented normally without an error using a camera of a general user terminal. Thus, the fourth length and the fifth length of the second QR image 400 are respectively greater than the first length and the second length of the first QR image 300 and are substantially the same. The sixth length of the second QR image 400 and the third length of the first QR image 300 are substantially the same.

As described above, the fourth length and the fifth length of the second QR image 400 are respectively greater than the first length and the second length of the first QR image 300 and are substantially the same, and length conversion is performed based on Equations (1) to (3) below.

$$x_d = \frac{x_u}{1 - \alpha|x_u|^2}, \quad \text{Equation (1)}$$

$$y_d = \frac{y_u}{1 - \beta|y_u|^2}, \text{ and} \quad \text{Equation (2)}$$

$$r_d = \frac{r_u}{1 - \gamma|r_u|^2}, \quad \text{Equation (3)}$$

In Equation (1), $x_u$ denotes the first length, $x_d$ denotes the fourth length, and $\alpha$ denotes a first weight assigned to the first direction.

In Equation (2), $y_u$ denotes the second length, $y_d$ denotes the fifth length, and $\beta$ denotes a second weight assigned to the second direction.

In Equation (3), $r_u$ denotes the third length, $r_d$ denotes the sixth length, and $\gamma$ denotes a third weight assigned to the third direction.

Because the fourth and fifth lengths of the second QR image 400 are greater than the first and second lengths of the first QR image 300 and are substantially the same, $\alpha$ and $\beta$ are greater than 0, and $\alpha$ and $\beta$ are substantially the same. However, although the fourth and fifth lengths of the second QR image 400 are respectively greater than the first and second lengths of the first QR image 300, maximum values thereof may be 1.4 times, and preferably, 1.3 times those of the first and second lengths of the first QR image 300. Accordingly, $\alpha$ and $\beta$ are greater than 0 and less than 0.25. Because the sixth length of the second QR image 400 and the third length of the first QR image 300 are substantially the same, $\gamma$ is substantially 0.

Figure 3:
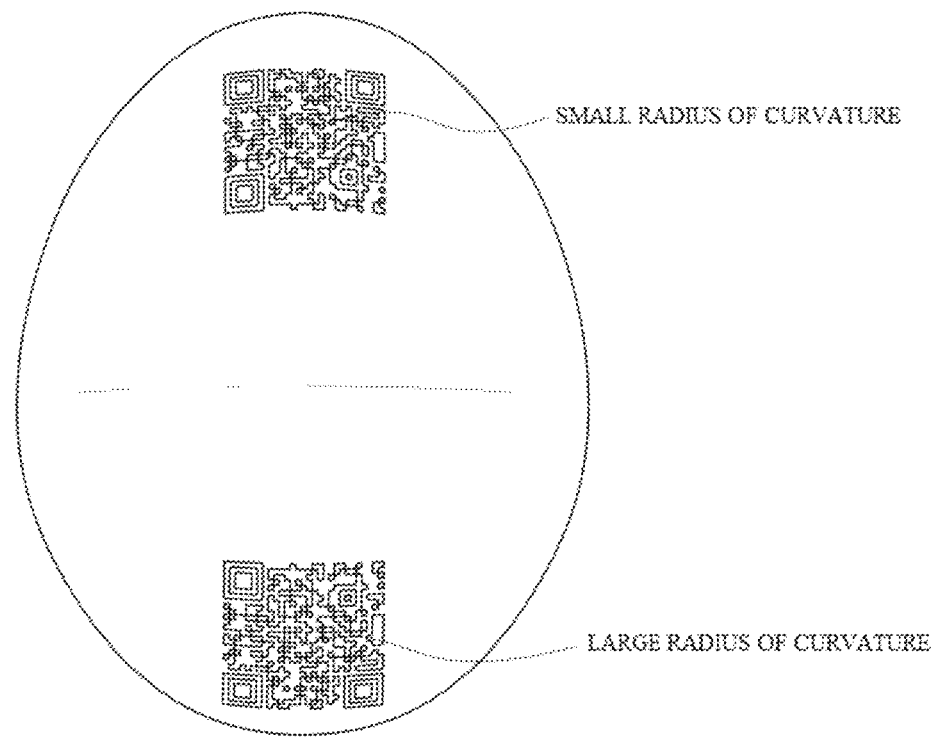
FIG. 3 is a diagram for describing image conversion performed on a QR code according to an embodiment of the present disclosure.

After determining the first to third weights, the first QR image 300 is divided into grids. For example, the first QR image 300 may be divided into grids having a size of 5×5 to 100×100, and preferably, grids having a size of 10×10. As shown in FIG. 3, one egg has a region having a large radius of curvature and a region having a small radius of curvature. A radius of curvature of an uppermost end of an egg may vary according to the size of the egg, i.e., whether the egg is a large egg, medium egg or a small egg.

However, because all regions of curved figures on which a QR code is to be printed have a convex shape, the lengths of grids on the same lines in the first and second directions passing through the center of the first QR image 300 may be increased to a maximum extent and a change of the lengths may be gradually reduced as distances between the grids increase.

Thus, the second weight may be reduced from $\beta$ to 0 as the distances of the grids from the center of the first QR image 300 in the first direction and a direction opposite to the first direction increase, and the first weight may be reduced from $\alpha$ to 0 as the distances of the grids from the center of the first QR image 300 in the second direction and a direction opposite to the second direction increase. The first weight may be assigned to the grid on the same line in the first direction, and the second weight may be assigned to the grid on the same line in the second direction.

When the first weight is reduced from $\alpha$ to 0 or the second weight is reduced from $\beta$ to 0, the first or second weight may be linearly or exponentially reduced as the distances of the grids from the center of the first QR image 300 in reference directions (i.e., the first direction and the direction opposite thereto or the second direction and the direction opposite thereto) increase.

Referring to FIG. 3, the larger a radius of curvature at the center of a curved figure on which the second QR image 400 is to be printed, the smaller the first weight and the second weight, and the smaller the radius of curvature radius at the center of the curved figure on which the second QR image 400 is to be printed, the larger the first weight and the second weight. That is, the first weight and the second weight when the radius of curvature at the center of the curved figure on which the second QR image 400 is to be printed is small may be respectively greater than the first weight and the second weight when the radius of curvature is large.

In the image conversion according to an embodiment of the present disclosure, the second QR image 400 may be stored in the memory 120 only when a degree (e.g., a ratio) of change of the lengths of the grids is equal to or less than a predetermined value. When the degree of change of the lengths of the grids is greater than the predetermined value, the first weight and the second weight are adjusted at least once according to feedback, and the second QR image 400 may be stored in the memory 120 only when a degree of change of the lengths of the grids is greater than the predetermined value.

Specifically, it may be determined whether a first ratio of the fourth length of the second QR image 400 to the first length of the first QR image 300 is equal to or less than a first predetermined value, the second QR image 400 may be stored in the memory 120 when the first ratio is equal to or less than the first predetermined value, and the first weight may be reduced, a fourth length of a new second QR image 400 generated through image conversion may be calculated, and it may be determined whether a ratio of the fourth length of the new second QR image 400 to the first length of the first QR image 300 is equal to or less than the first predetermined value when the first ratio is greater than the first predetermined value.

Specifically, it may be determined whether a second ratio of the fifth length of the second QR image 400 to the second length of the first QR image 300 is equal to or less than the first predetermined value, the second QR image 400 may be stored in the memory 120 when the second ratio is equal to or less than the first predetermined value, and the second weight may be reduced, a fifth length of a new second QR image 400 generated through image conversion may be calculated, and it may be determined whether a ratio of the fifth length of the new second QR image 400 to the second length of the first QR image 300 is equal to or less than the first predetermined value when the second ratio is greater than the first predetermined value.

The first predetermined value may be selected from a range of 1 to 1.4. Preferably, 1.3 may be selected as the first predetermined value.

Figure 4:
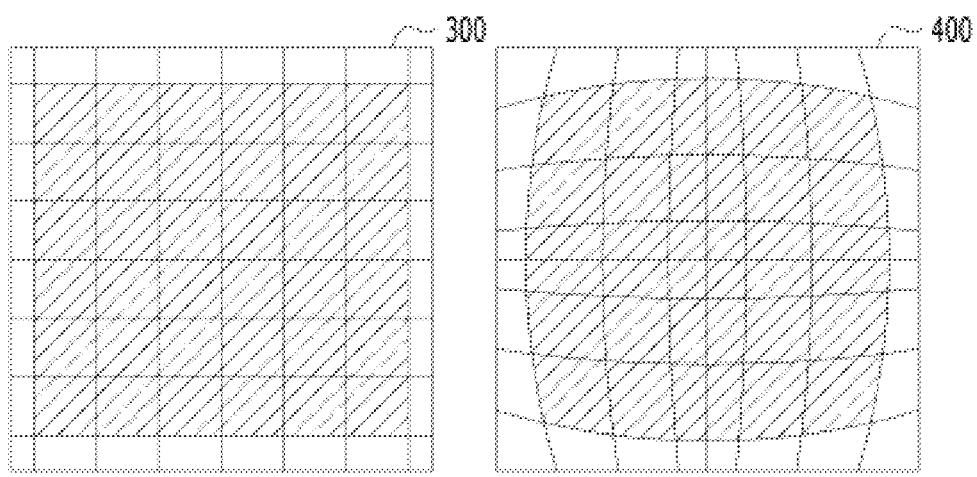
FIG. 4 is a diagram for describing image conversion performed on a QR code according to an embodiment of the present disclosure.

Hereinafter, image conversion performed on a QR code according to an embodiment of the present disclosure will be described in detail with reference to FIG. 4.

In image conversion according to an embodiment of the present disclosure, the second QR image 400 may be stored in the memory 120 only when a ratio between an area of a second QR image 400 and an area of a first QR image 300 generated by changing the lengths of the grids is equal to or less than a predetermined value. When the ratio between the area of the second QR image 400 and the area of the first QR image 300 is greater than the predetermined value, the first weight and the second weight may be adjusted at least once according to feedback, and the second QR image 400 may be stored in the memory 120 only when a ratio between new areas is equal to or fess than the predetermined value.

Specifically, the area of the first QR image 300 and the area of the second QR image 400 may be calculated, it may be determined whether a ratio of the area of the second QR image 400 to the area of the first QR image 300 is equal to or greater than a second predetermined value, the second QR image 400 may be stored in the memory 120 when the ratio is equal to or less than the second predetermined value, and the first weight and the second weight may be reduced, an area of a new second QR image 400 generated through the image conversion may be calculated, and it may be determined whether a ratio of the area of the new second QR image 400 to the area of the first QR image 300 is equal to or less than the second predetermined value when the ratio is greater than the second predetermined value.

The second predetermined value may be selected from a range of 1 to 1.4.

Referring to FIG. 3, a ratio between grids into which the first QR image 300 is divided may be reduced as a radius of curvature at the center of a curved figure on which the second QR image 400 is to be printed is large, and may be increased as the radius of curvature at the center of the curved figure to which the second QR image 400 is to be printed is small. Therefore, a QR recognition rate may be increased by selecting an appropriate division ratio according to a radius of curvature.

Figure 5:
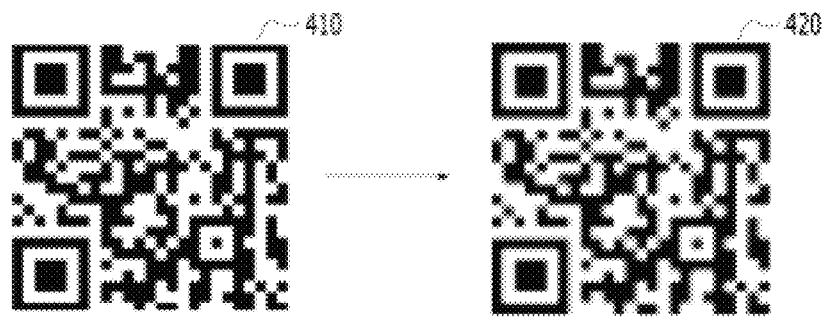
FIG. 5 is a diagram for describing image conversion performed on a QR code according to an embodiment of the present disclosure.

Hereinafter, image conversion performed on a QR code according to an embodiment of the present disclosure will be described in detail with reference to FIG. 5.

A first QR image 300 may be divided into grids, a second QR image 400 may be generated by performing image conversion on the grids through changing of the lengths of the grids, and an anti-aliasing technique may be applied to the second QR image 400, thereby smoothing a boundary between the grids. In this case, a boundary between grids divided in a QR image 420 to which the anti-aliasing technique is applied may be processed more smoothly than a boundary between grids divided in a QR image 410 to which the anti-aliasing technique has yet to be applied. Therefore, by applying the anti-abasing technique, a QR recognition rate for a curved figure such as an egg may be increased.

Figure 6:
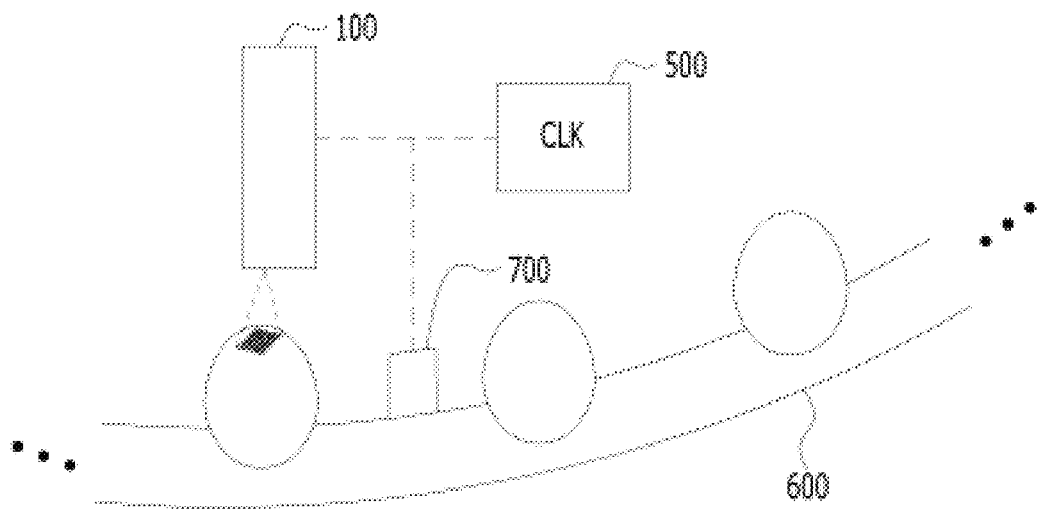
FIG. 6 is a diagram schematically illustrating a system for printing a QR code according to an embodiment of the present disclosure.

Hereinafter, a system for printing a QR code according to an embodiment of the present disclosure will be described in detail with reference to FIG. 6.

The system for printing a QR code according to the embodiment of the present disclosure may include the device 100 for printing a QR code, a clock 500 with a certain period, a conveyor belt 600 located below the device 100 and configured to transfer a curved figure according to the period of the clock 500, and a sensor 700 located on the conveyor belt 600 and configured to detect whether there is a curved figure on the conveyor belt 600. Here, because the clock 500 is synchronized with the device 100 and the sensor 700, when a curved figure on the conveyor belt 600 is detected by the sensor 700, the device 100 may print the second QR image 400 on the curved figure located below the device 100.

Meanwhile, the sensor 700 may be, for example, an optical sensor or an infrared (IR) sensor.

The above-described embodiments of the present disclosure are intended for purposes of illustration and the present disclosure is not limited thereto. In addition, various modifications and changes may be made in the present disclosure by those of ordinary skill in the art without departing from the spirit and scope of the present disclosure and should be considered to be within the scope of the present disclosure.

REFERENCE NUMERALS

100: device for printing QR code
110: processor
120: memory
130: input device
140: output device
200: server
300: first QR image
400: second QR image
410: QR image to which anti-aliasing technique has yet to be applied
420: QR image to which anti-aliasing technique is applied
500: clock
600: conveyor belt
700: sensor

The invention claimed is:

1. A device for printing a quick response (QR) code, comprising:
   at least one processor; and
   at least one memory storing instructions causing, when executed by the at least one processor, the at least one processor to:
   receive quick response (QR) data from a server; create a first QR image based on the QR data; perform image conversion on the first QR image to create a second QR image; store the second QR image in the at least one memory; and print the second QR image on a curved figure,
   wherein the first QR image comprises: a first length representing a length from a center of the first QR image in a first direction; a second length representing a length from the center of the first QR image in a second direction perpendicular to the first direction; and a third length representing a length from the center of the first QR image in a third direction diagonal to the first direction and the second direction,
   the second QR image comprises: a fourth length representing a length from a center of the second QR image in the first direction; a fifth length representing a length from the center of the second QR image in the second direction; and a sixth length representing a length from the center of the second QR image in the third direction,
   the fourth length and the fifth length of the second QR image are respectively greater than the first length and the second length of the first QR image, and
   the sixth length of the second QR image is equal to the third length of the first QR image.

2. The device of claim 1, wherein the image conversion is performed on the basis of the following Equations (1) to (3):

$$x_d = \frac{x_u}{1 - \alpha |x_u|^2}, \qquad \text{Equation (1)}$$

$$y_d = \frac{y_u}{1 - \beta |y_u|^2}, \text{ and} \qquad \text{Equation (2)}$$

$$r_d = \frac{r_u}{1 - \gamma |r_u|^2}, \qquad \text{Equation (3)}$$

wherein in Equation (1), $x_u$ denotes the first length, $x_d$ denotes the fourth length, and $\alpha$ denotes a first weight assigned to the first direction, in Equation (2), $y_u$ denotes the second length, $y_d$ denotes the fifth length, and $\beta$ denotes a second weight assigned to the second direction, in Equation (3), $r_u$ denotes the third length, $r_d$ denotes the sixth length, $\gamma$ denotes a third weight assigned to the third direction, $\alpha$ and $\beta$ are greater than 0 and less than 0.25, and $\gamma$ is 0, and the curved figure comprises an egg-shaped curved figure with different radii of curvature at points on curved surfaces.

3. The device of claim 2, wherein, during the image conversion, the at least one processor is configured to:
divide the first QR image into grids;
reduce the second weight from β to 0 as distances of the grids from a center of the first QR image in the first direction and a direction opposite to the first direction increase;
reduce the first weight from α to 0 as distances of the grids from the center of the first QR image in the second direction and a direction opposite to the second direction increase;
apply the first weight to grids on the same line in the first direction; and
apply the second weight to grids on the same line in the second direction.

4. The device of claim 3, wherein the at least one processor is further configured to:
reduce the first weight and the second weight as a radius of curvature at the center of the curved figure on which the second QR image is to be printed increases; and
increase the first weight and the second weight as the radius of curvature at the center of the curved figure on which the second QR image is to be printed decreases.

5. The device of claim 4, wherein the at least one processor is further configured to:
determine whether a first ratio of the fourth length of the second QR image to the first length of the first QR image is equal to or less than a first predetermined value;
store the second QR image in the memory when the first ratio is equal to or less than the first predetermined value;
reduce the first weight, calculate a fourth length of a new second QR image generated through the image conversion, and determine whether a ratio of the fourth length of the new second QR image to the first length of the first QR image is equal to or less than the first predetermined value, when the first ratio is greater than the first predetermined value;
determine whether a second ratio of the fifth length of the second QR image to the second length of the first QR image is equal to or less than the first predetermined value, and store the second QR image in the memory when the second ratio is equal to or less than the first predetermined value; and
reduce the second weight, calculate a fifth length of a new second QR image generated through the image conversion, and determine whether a ratio of the fifth length of the new second QR image to the second length of the first QR image is equal to or less than the first predetermined value, when the second ratio is greater than the first predetermined value,
wherein the first predetermined value is selected from a range of 1 to 1.4.

6. The device of claim 5, wherein the at least one processor is further configured to:
calculate an area of the first QR image and an area of the second QR image;
determine whether a ratio of the area of the second QR image to the area of the first QR image is equal to or less than a second predetermined value;
store the second QR image in the memory when the ratio is equal to or less than the second predetermined value; and
reduce the first weight and the second weight, calculate an area of a new second QR image generated through the image conversion, and determine whether a ratio of the area of the new second QR image to the area of the first QR image is equal to or less than the second predetermined value when the ratio is greater than the second predetermined value,
wherein the second predetermined value is selected from a range of 1 to 1.4.

7. The device of claim 6, wherein the at least one processor is further configured to:
smooth a boundary between the grids by applying an anti-aliasing technique; and
reduce a ratio between grids into which the first QR image is to be divided as the radius of curvature at the center of the curved figure on which the second QR image is to be printed increases, and increase the ratio between grids into which the first QR image is to be divided as the radius of curvature at the center of the curved figure on which the second QR image is to be printed decreases.

8. A method of printing a quick response (QR) code, comprising:
receiving QR data from a server;
creating a first QR image based on the QR data;
performing image conversion on the first QR image to create a second QR image;
storing the second QR image in a memory; and
printing the second QR image stored in the memory on a curved figure,
wherein the curved figure comprises an egg-shaped curved figure with differ of curvature at points on curved surfaces, and
in the image conversion, lines connecting vertices of the first QR image are modified to be convex while maintaining the vertices of the first QR image so as to create the second QR image allowing QR recognition even on the curved figure.

* * * * *